United States Patent
Molle

(10) Patent No.: US 11,159,033 B2
(45) Date of Patent: Oct. 26, 2021

(54) MODULAR ELECTRIC CHARGING APPARATUS

(71) Applicant: Andrew Molle, Corona, CA (US)

(72) Inventor: Andrew Molle, Corona, CA (US)

( * ) Notice: Subject to any disclaimer, the term of this patent is extended or adjusted under 35 U.S.C. 154(b) by 62 days.

(21) Appl. No.: 16/843,790

(22) Filed: Apr. 8, 2020

(65) Prior Publication Data

US 2020/0328604 A1    Oct. 15, 2020

Related U.S. Application Data

(60) Provisional application No. 62/831,823, filed on Apr. 10, 2019.

(51) Int. Cl.
| | |
|---|---|
| *H02J 7/00* | (2006.01) |
| *H01R 25/14* | (2006.01) |
| *B60L 53/18* | (2019.01) |
| *H02G 5/04* | (2006.01) |
| *B60L 53/35* | (2019.01) |

(52) U.S. Cl.
CPC ............ *H02J 7/0042* (2013.01); *B60L 53/18* (2019.02); *B60L 53/35* (2019.02); *H01R 25/14* (2013.01); *H02G 5/04* (2013.01)

(58) Field of Classification Search
CPC ........ H02J 7/0042; H01R 25/14; B60L 53/35; B60L 53/18; H02G 5/04
USPC ......................................................... 320/109
See application file for complete search history.

(56) References Cited

U.S. PATENT DOCUMENTS

| | | |
|---|---|---|
| 1,262,630 A | 4/1918 | Brown |
| 1,343,458 A | 6/1920 | Koehl |
| 1,447,942 A | 3/1923 | Fitzgerald |
| 2,786,255 A | 3/1957 | Heeb |
| 3,263,378 A | 8/1966 | Dorris |
| 4,145,857 A | 3/1979 | Tilsen |
| 4,258,897 A | 3/1981 | Stees |
| 4,328,654 A | 5/1982 | Van Ginkel et al. |
| 4,961,293 A | 10/1990 | House et al. |
| 4,979,907 A | 12/1990 | Lee |
| 4,993,878 A | 2/1991 | Beamer |
| 5,066,165 A | 11/1991 | Wofford et al. |
| 5,270,489 A | 12/1993 | Thibault |
| 5,281,052 A | 1/1994 | Beamer |
| 5,536,361 A | 7/1996 | Kondo et al. |
| 5,587,554 A | 12/1996 | Kendrick, Jr. |
| 5,773,756 A | 6/1998 | DiTullio |

(Continued)

*Primary Examiner* — Sun J Lin
(74) *Attorney, Agent, or Firm* — Kirk A. Buhler; Buhler & Associates Patenting

(57) ABSTRACT

Improvements in a modular electric charging apparatus are disclosed. The modular electric charging apparatus provides a universal base system that can be used to install an electrical power system. The universal base system allows cabinets provided from different manufacturers to be connected by electrical wiring into their unique cabinets. A below grade structure of an open frame structure is used for setting and casting concrete around the open frame. The open frame is set at a level with a desired finished surface with a trench canal and the concrete can be poured into both sides of the open frame. The modular electric charging apparatus also uses a canal that extends from a base of the cabinet. The canal is easily cut to a length or multiple canals can be placed in series for extending the length. Buss bars are set and are secured in an insulated spacer within the canal for use in connecting to a plurality of above ground charging stations.

20 Claims, 3 Drawing Sheets

(56) References Cited

U.S. PATENT DOCUMENTS

Figure 1:
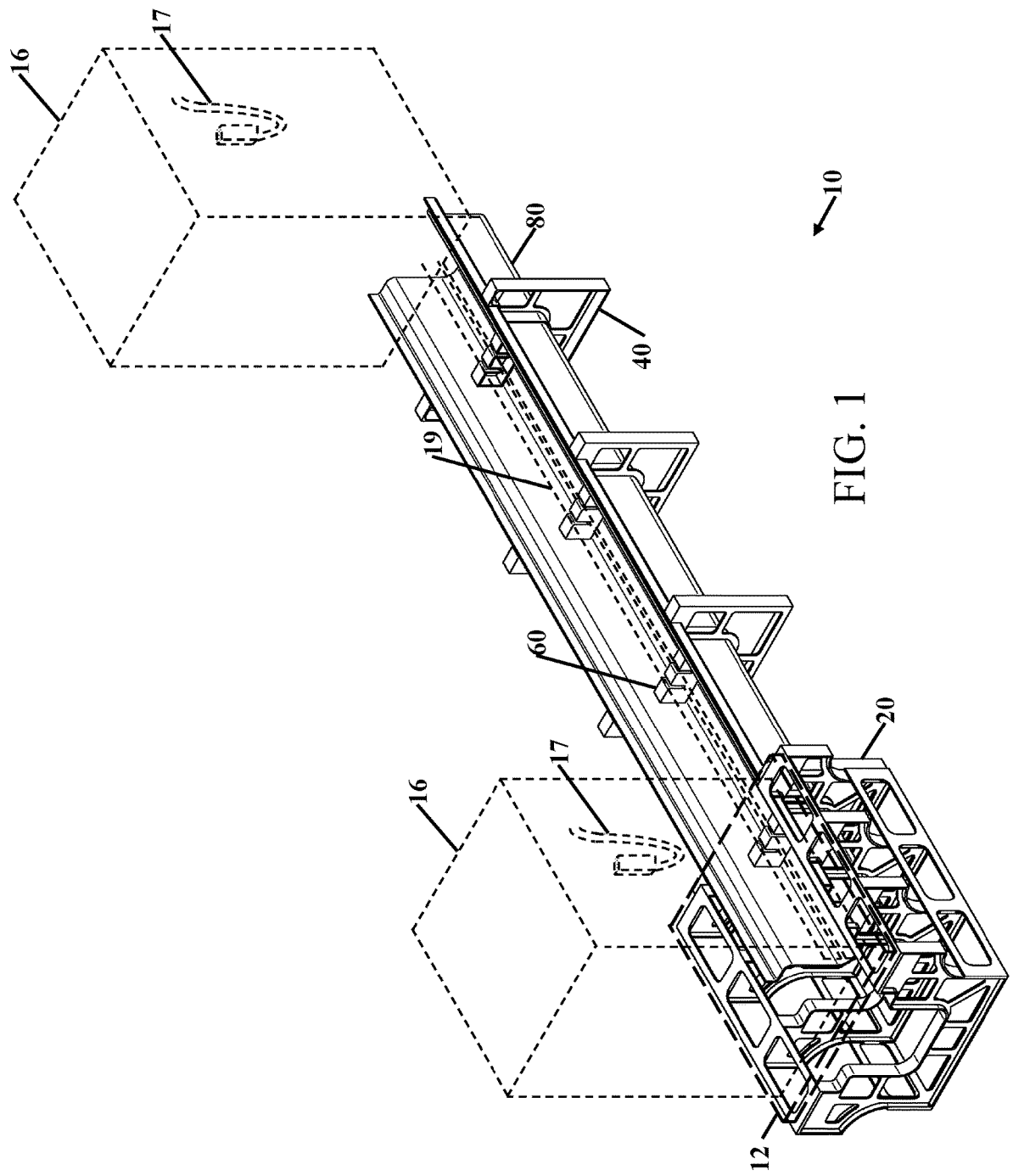

| | | |
|---|---|---|
| 6,321,928 B1 | 11/2001 | Goldenstein et al. |
| 6,365,297 B1 | 4/2002 | Wolczak et al. |
| 6,853,801 B2 | 2/2005 | Wefler |
| 7,475,515 B2 | 1/2009 | Machledt et al. |
| 9,068,341 B2 | 6/2015 | Chrien |

MODULAR ELECTRIC CHARGING APPARATUS

CROSS REFERENCE TO RELATED APPLICATIONS

This application claims the benefit of Provisional Application Ser. No. 62/831,823 filed Apr. 10, 2019 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in an electric charging apparatus. More particularly, the present electric charging apparatus creates a versatile and upgradable charging and connection platform that can be used with a variety of different providers of vehicle charging systems, battery storage systems, back-up generation systems and utility grid systems.

Description of Related Art Including Information Disclosed Under 37 CFR 1.97 and 1.98

Electric vehicles are becoming more popular and the need to charge the vehicles at different locations continues to increase. The construction of the charging stations is typically at locations where a person may park their vehicle for an extended period of time. As the number of vehicles that will be charged increases the charging stations need to accommodate more and more vehicles. The charging and updating of the different vehicles and charging connectors will also need accommodate the expansion of the industry. Most vehicle charging stations are manufactured and installed with a finite number of stations and any upgrades or expansion requires removal of the entire previous system. This can make the charging stations unavailable for weeks or months while the construction is being performed. A number of patents and or publications have been made issued that address different aspects of the problems. Exemplary examples of patents and or publication that try to address this/these problem(s) are identified and discussed below.

U.S. Pat. No. 2,786,255 issued on Mar. 26, 1957 to V. C. Heeb and is titled Form for Pouring Concrete Ditch Dams. This patent discloses an improvements and structural refinements in concrete forms, and the principal object of the invention is to provide a form of the character which may be quickly, easily and economically employed for the pouring of concrete dams in irrigation ditched, and the like. While this patent covers forming a ditch dams the forms must be removed after the concrete sets. It also does not include the elements for a power transmission for charging an electric vehicle.

U.S. Pat. No. 5,538,361 issued on Jul. 23, 1996 to John V. Beamer and is titled Apparatus for Forming a Trench. This patent discloses a system for forming a single-walled trench comprising a pair of frame members, each having a horizontal section and a section depending from the horizontal section; a collapsing pair of wall pans having sidewalls interior to the depending portion of the frame members, a bottom floor disposed between the sidewalls, a releasing mechanism to collapse inward the sidewalls. While this patent discloses a trench form it does not provide support for internal power transmission.

U.S. Pat. No. 4,145,857 issued on Mar. 27, 1979 to Benjamin L. Tilsen and is titled Base for Mounting Electrical Equipment. This patent discloses a sectionalized structure of preformed wall panels especially adapted for use as base for burial in the earth for mounting above-ground electrical equipment such as sectionalizing cabinets, transformers, electrical switch gear boxes, and similar equipment connected to underground utility cables. This patent is essentially an open cavity without any structure for power transmission out of the cavity.

U.S. Pat. No. 6,321,928 issued on Nov. 27, 2001 to Kim M. Goldenstein and is titled Enclosure Mounting Pad with Support Base. This patent discloses an enclosure installation assembly comprises a support base and a mounting pad adapted to be secured to the support base. The support base, having a lower portion slightly larger than its upper portion, is placed in a hole in the ground. Dirt is compacted around the support base to secure the support base in place. This patent is also an open cavity that is filled and therefore eliminated the ability to upgrade connections outside of the base.

U.S. Pat. No. 262,630 issued on Aug. 15, 1882 to T. N. Vail and is titled Subterranean System of Electrical Conductors. This patent discloses ab underground wires for electrical systems of communication and improved methods of laying them. This patent is not for power transmission lines and further does not contain buss wiring where connections can be made along the length of the buss wire or strip.

U.S. Pat. No. 343,458 issued on Jun. 8, 1886 to G. S. Hull and is titled Underground Conduit for Electrical Conductors. The object of this invention is to prevent the loss of conductivity which results from the breaking of electrical conductors in test boxes and provides test pins to test the condition of each conductor. This patent does not provide buss wiring or strips to connect electrical power for a charging system.

What is needed is an electric vehicle charging apparatus that can be easily upgraded, expanded and can accommodate different providers and vehicles. The proposed electric charging apparatus provides the solution including, but not limited to power distribution and charging systems.

BRIEF SUMMARY OF THE INVENTION

It is an object of the modular electric charging apparatus to provide a universal base system that can be used to install electrical power. The universal base allows for cabinets from different manufacturers to connect electrical wiring into their unique cabinet. The cabinet can then connect into a conduit system for distribution to a plurality of vehicle charging locations for distribution. The universal base can have a variety of securing mounts to accommodate different size and shape cabinets and locations for power cable routing into the cabinets as needed for the manufacturer, electrical code and building code.

It is an object of the modular electric charging apparatus to have an open frame structure for setting and casting concrete around the open frame. The open frame is set level with the desired finished surface with a trench canal and the concrete can be poured into both sides of the cable trench form frame. The open nature of the cable trench form frame allows the concrete to flow around the frame and also sets the frame in the concrete. There is no removal of the frame after the concrete sets and frame is a permanent part of the structure. The frame can further include mounting locations and apparatus that can extend into the poured concrete to provide structural security to above surface mounted housings.

It is another object of the modular electric charging apparatus to include a support frame and canal that extends from the cabinet base. The canal is easily cut to length or multiple canals can be placed in series for extending the length. This allows for future expansion and room for additional charging stations to be added at the future. The length of the canal can also be extended at a future time without effecting the operation of installed charging stations. An insulated spacer is installed into the support frame to ensure that the canal maintains its shape and provides an electrical connection support system.

It is still another object of the modular electric charging apparatus to include a plurality of buss bar contacts. The buss bars set and/or buss cables and are secured in the insulated spacer. The buss bars extend the length of the canal and provide electrical connection at any point along the length of the canal. This also allows an installer to place a second charging connection to allow vehicles on both sides of the canal. The buss bars can also be extended in the future to provide connections for additional charging stations. The cross-section of the buss bars can also be sized, increased or changed based upon the amount of power that is being used to charge vehicles. The insulated spacer only secured the buss bars on three sides to provide to taller buss bars to increase power transmission capacity.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

Figure 2:
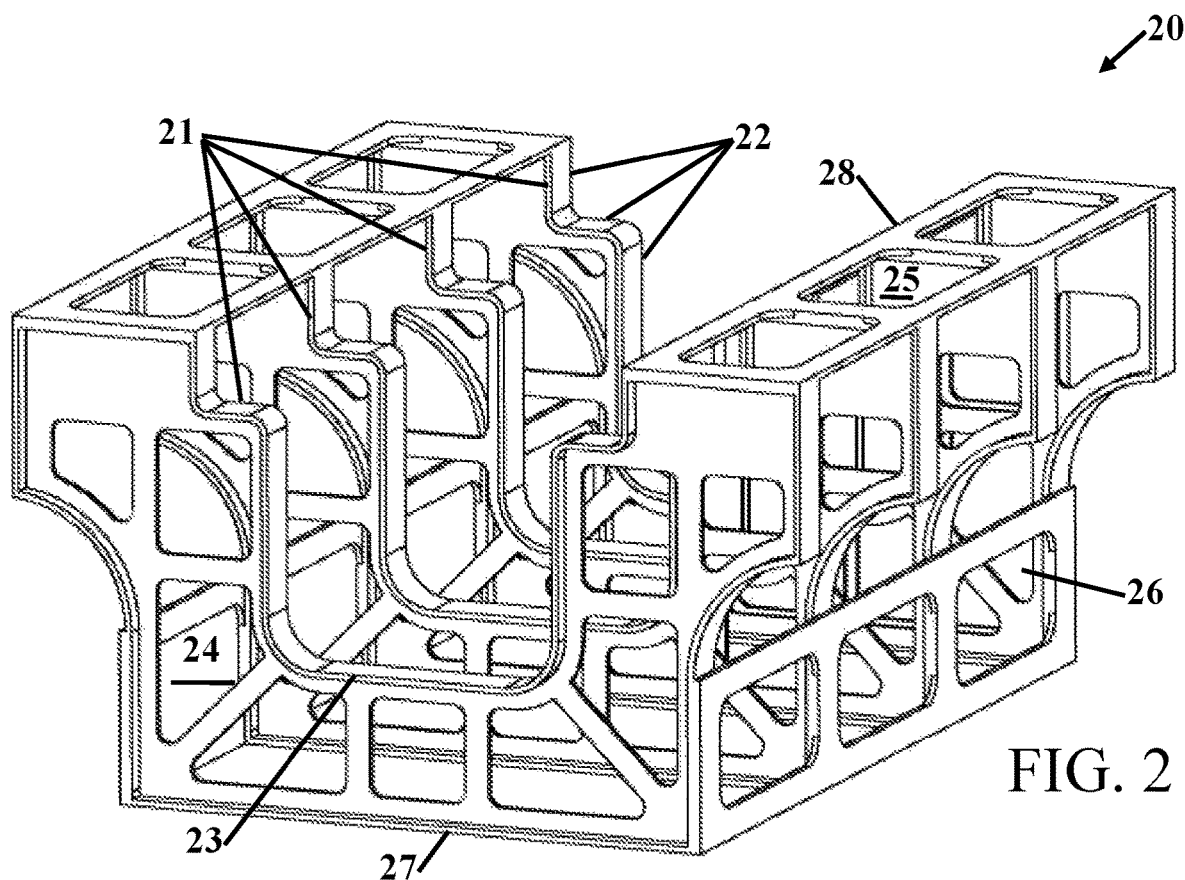
Figure 3:
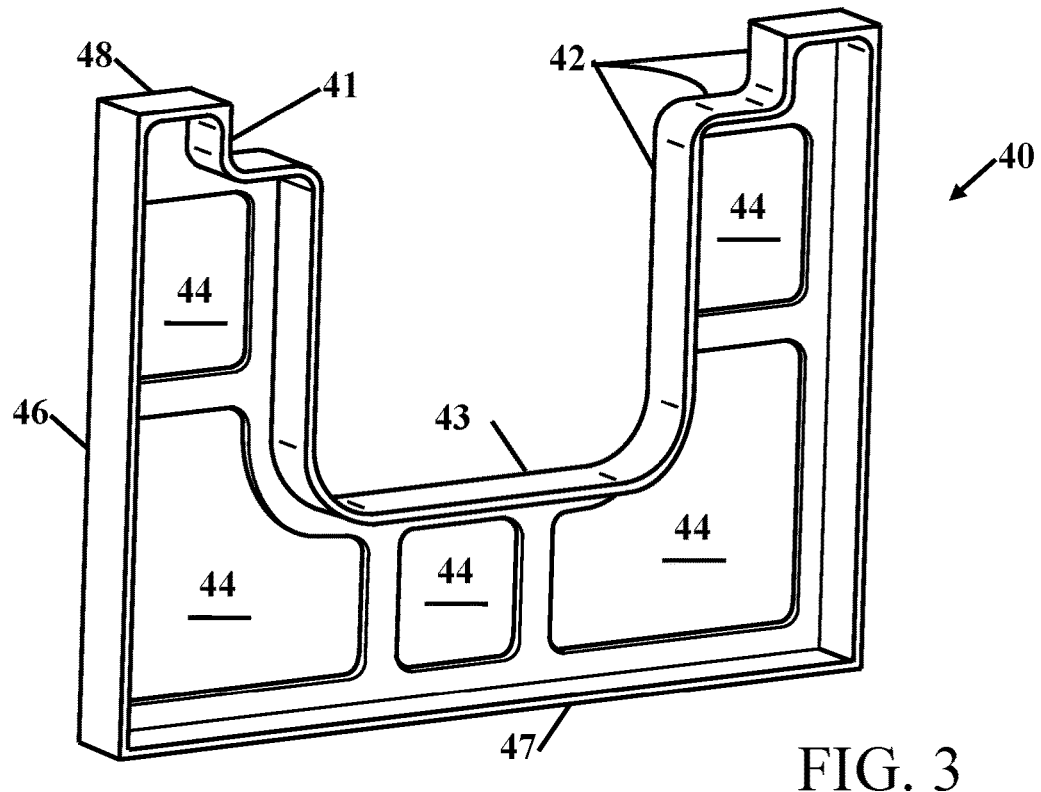
Figure 4:
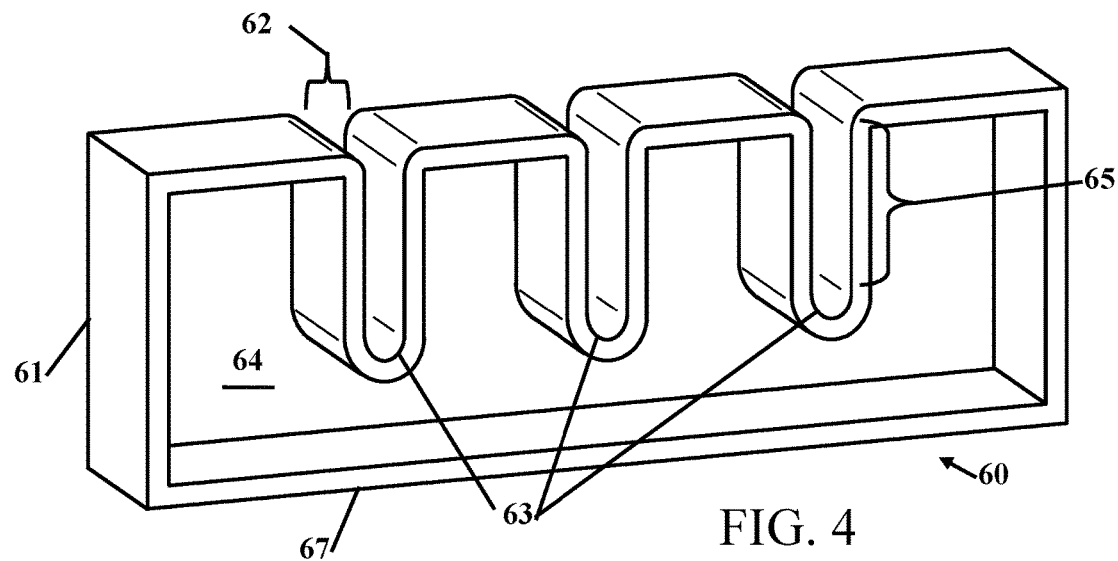
Figure 5:
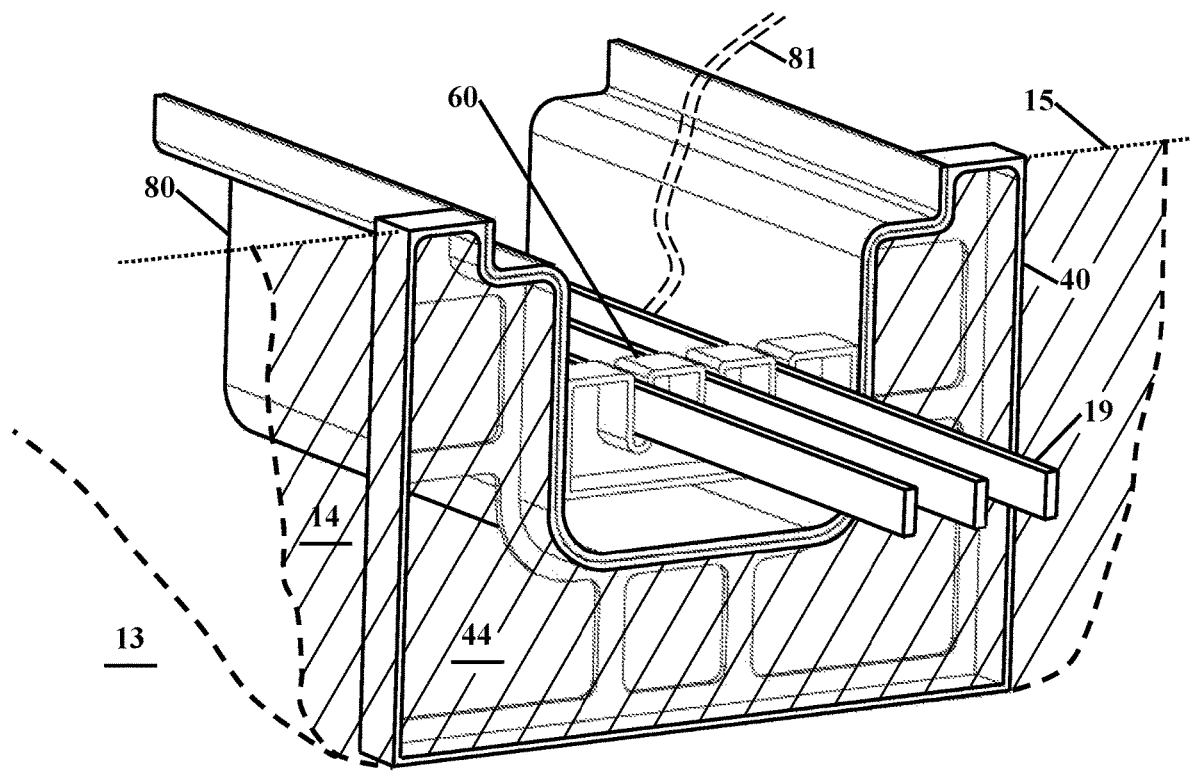

FIG. 1 shows a modular electric charging apparatus.
FIG. 2 shows a perspective view of an electric charger support stand.
FIG. 3 shows a perspective view of a trench canal support frame.
FIG. 4 shows a perspective view of an insulated spacer.
FIG. 5 shows a perspective sectional view of the trench canal with the buss bars installed.

DETAILED DESCRIPTION OF THE INVENTION

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, but is merely representative of various embodiments of the invention. The illustrated embodiments of the invention will be best understood by reference to the drawings, wherein like parts are designated by like numerals throughout.

ITEM NUMBERS AND DESCRIPTION

| | |
|---|---|
| 10 vehicle charging apparatus | 12 mounting plate |
| 13 earth | 14 concrete |
| 15 grade | 16 electric vehicle chargers |
| 17 vehicle connector | 19 buss bar(s) |
| 20 electric vehicle charger support stand | |
| 21 supporting ribs | 22 canal support(s) |
| 23 canal bottom support | 24 voids |
| 25 top openings | 26 side openings |
| 27 bottom | 28 top surface |
| 40 support frame | 41 step |
| 42 canal support(s) | 43 canal bottom support |
| 44 voids | 46 side |
| 47 bottom | 48 top surface |
| 60 insulated spacer | 61 side |
| 62 vertical gap | 63 slots |
| 64 recess | 65 vertical |
| 67 bottom | 80 trench/canal |
| 81 wires/cables | |

FIG. 1 shows a modular electric charging apparatus 10. The vehicle charging apparatus 10 provides a complete solution for present day vehicle charging and for future electric vehicle charging. An electric vehicle charger support stand 20 sits below a mounting plate 12 below a electric vehicle chargers 16 or an electrical junction box. The mounting plate 12 may be a concrete pad. The electric vehicle charger support stand 20 is constructed with voids between the webbing to allow concrete to be poured from the outsides of the electric vehicle charger support stand 20 and flow through the structure to create a unitized pad for the electric vehicle chargers 16. The electric vehicle charger support stand 20 remains embedded within the concrete and does not require removal of forms. The electric vehicle charger support stand 20 can have one or multiple threaded studs or posts for securing the electric vehicle chargers 16. The studs, posts or inserts are configured to match mounting specifications for one or multiple manufactures of junction boxes. The electric vehicle charger support stand 20 is a cable trench form that accepts a trench or canal 80.

The trench or canal 80 enters into one or both sides of the electric vehicle charger support stand 20. The trench or canal 80 can be cut to a shorter length or multiple sections can be used to extend the length of the trench or canal 80. Utility power cable or connections enter the trench 80 as designated by installation plans and ordinances. A plurality of insulated spacers 60 are shown within the trench 80. The spacers 60 retain the shape of the trench 80 under the pressures of concrete that is poured in and around the trench 80 and also provide insulation and spacing for electrical buss bars 19 that provide electrical power from the electric vehicle chargers 16 along the length of the trench 80. The trench also remains after concrete is poured along the length of the trench 80.

The trench 80 is supported on support frame(s) 40 that also have voids to allow concrete to pass through the support frame(s) 40. Both the support frame(s) 40 and the electric vehicle charger support stand 20 are placed below finished grade in a ground recess. The top of the support frame(s) 40 and the electric vehicle charger support stand 20 may be at grade. This figure shows a plurality of electric vehicle chargers 16 or electrical junction box with vehicle connectors 17 or vehicle charging stations.

The vehicle charging stations can be connected to the buss bar 19 at any location along the length of the buss bar 19 and can be repositioned as needed without requiring demolition changes to the vehicle charging apparatus 10.

FIG. 2 shows a perspective view of an electric charger support stand 20. The electric vehicle charger support stand 20 is a sub-grade EV equipment support stand designed that supports a precast EV charger concrete pad and EV charger. The electric vehicle charger support stand 20 support stand is designed to be installed level with the top surface 28 of the finished grade. This allows a cable trench and its cover can pass through freely at varying angles. Once the electric vehicle charger support stand 20 is set at the desired depth within a hole the bottom 27 surface will be placed and leveled on the bottom of the hole. The electric vehicle charger support stand 20 has supporting surfaces for supporting the canal support(s) 22 sides and the canal bottom support 23. While the figure shows four supporting ribs 21 it is contemplated that more than four ribs or less than four supporting ribs 21 can be used based upon the design, length and requirements. Concrete is poured in through the top surface 28 openings 25 and/or through the side sides and through the side openings 26 of the ground opening.

Once concrete is poured the open nature of the electric vehicle charger support stand 20 allows concrete to flow through and around the open void 24 structure. Once the concrete has cured, the cable trench will be locked in place. Cable trench cover to be installed under precast equipment pad and can be removable. This support stand is designed with cutouts for protective bollard placement in up to 4 corner locations as needed, even flow of concrete throughout trench during backfill, and rebar reinforcement. A concrete vibrator should be used during the concrete pour the ensure all air is released from trench cavities or openings 24, 26. It is further contemplated that stud plates or other securing hardware can be installed into or around the electric vehicle charger support stand 20 and cast with the concrete to secure the hardware with the electric vehicle charger support stand 20 as a single unitized structure. All of the forms remain after the concrete has set.

FIG. 3 shows a perspective view of a trench canal support frame 40. This is a sub-grade pour in place cable trench system. The support frame 40 is designed with support stands to sit with the bottom surface 47 to properly center itself and hold uniform separation from trench floor and walls. The sides 46 can sit against a side of the trench or can be spaced from a trench side wall. The top surface 48 of the support frame 40 can be located at finished grade. A step 41 provides a recess for a cover. A variation of brackets can be installed inside the cable trench for the use of either continuous buss bars or individual wires/cables.

The support frame 40 is used with concrete that can flow around the support frame 40 and through the voids 44. The support frame 40 has a canal bottom support 43 surface and side canal support 42 surfaces for the canal (not shown). The support stands also are dimensioned to provide required structural wall thickness of concrete. Support stands are designed with cutouts to provide even flow of concrete throughout the trench and rebar reinforcement if required. A concrete vibrator should be used during the concrete pour the ensure all air is released from trench cavities. Cable trench will use a solid or ventilated cover depending on its application.

FIG. 4 shows a perspective view of an insulated spacer 60. The insulated spacer 60 provides support for a continuous sub-grade buss bar system. The buss bar(s) have a width 62 that fit within the vertical gaps or slots 63 and will run AC or DC current within the cable trench supported by non-conductive brackets or insulated spacer 60. While a particular width of the slots is shown it is contemplated that the width 62 of the slots 63 can be different based upon the amount of power that is being used in the system. The insulated spacer 60 are designed to hold buss bars, wires or cables off the floor of the cable trench to allow water to flow without interrupting service.

The insulated spacer 60 will also separate each bar from making contact with each other. The sides 61 and bottom 67 of the insulated spacer 60 fit within the canal (not shown in this figure) and provide support to the canal when concrete is poured. While the insulated spacer 60 is shown with a recess 64 the insulated spacer 60 can also be made with a solid construction. Further, while vertical gaps or slots 63 for three buss bars is shown more than three slots 63 can be used to support additional buss bars, but the insulated spacer 60 can be constructed with more than three slots 63 and the installer can utilize the desired number of slots and leave some slots 63 open.

FIG. 5 shows a perspective sectional view of the trench canal 80 with the buss bars 19 installed. The buss bars 19 will be installed in varying segment lengths and configurations as needed. The cross-section of the buss bars can also be sized, increased or changed based upon the amount of power that is being used to charge vehicles. The insulated spacer only secured the buss bars on three sides to provide to taller buss bars to increase power transmission capacity. Buss bars 19 will bolt to each other to supply power throughout the length of each cable trench 80 and provide the ability for future expansion of the system. Wires/cables 81 will bolt to buss bars 19 at each EV charger location and jump power into each unit.

The buss bars are typically about 9' feet in length and the buss bars 19 rest in the grooves of the insulated spacer 60. To create a longer connection trench, trench couplers are used to join trench canal 80 pieces together. The cable trench 80 will pass through the support frame 40 and electric vehicle charger support stand 20 (not shown in this figure) with some amount of play as they will need to be level upon installation and the cable trench will have minimal pitch to match existing grade 15. In this figure, concrete 14 is shown in the ground cavity and the concrete 14 is shown passing through the voids 44 to secure the components into the ground or earth 13.

While the figures and text show and describe an underground or subterranean electrical buss structure, it is contemplated that it could also exist as an above ground buss chase structures, attached to a solar canopy structures or in a parking structure and may include circuit breakers and disconnects. The system shows a use with vehicle charging stations, the system can also be used for electric vehicle service equipment, battery energy storage systems, back-up electrical generation systems, utility grid systems, DC rail transportation systems and can be upgraded as technology evolves.

Thus, specific embodiments of an electric vehicle charging apparatus have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A modular electric charging apparatus comprising:
   a cable trench form for an electric charger support stand to support an electrical junction box;
   a canal configured to be integrated into a support frame for said electric charger support stand, wherein said canal is supported on a plurality of support frames and;
   at least two insulated spacers within said canal, wherein said at least two insulated spacers having slots for supporting buss bars, wires or cables, said buss bars connecting said electrical junction box and providing electrical energy from said electrical junction box to a plurality of vehicle charging stations.

2. The modular electric charging apparatus according to claim 1, wherein said buss bars, wires or cables provide connections to said plurality of vehicle charging stations at any locations along said canal.

3. The modular electric charging apparatus according to claim 1, wherein said cable trench form for said electric charger support stand is cast into concrete.

4. The modular electric charging apparatus according to claim 3, wherein said at least two insulated spacers extend between sides of said canal and support side walls of said canal.

5. The modular electric charging apparatus according to claim 1, wherein said canal and said buss bars are expandable without effecting said electrical junction box.

6. The modular electric charging apparatus according to claim 1, wherein the modular electric charging apparatus provides power distribution for a group consisting of electric vehicle service equipment, electric vehicle chargers, battery energy storage systems, back-up electrical generation systems, utility grid systems and DC rail transportation systems.

7. The modular electric charging apparatus according to claim 1, further includes a mounting plate that is configured to cover a top of said cable trench form.

8. The modular electric charging apparatus according to claim 7, wherein said mounting plate is changeable.

9. The modular electric charging apparatus according to claim 1, wherein at least one second electrical junction box is connected to said buss bars, wires or cables.

10. The modular electric charging apparatus according to claim 9, wherein said at least one a second electrical junction box is configured to be mounted on said canal at any location along said canal.

11. The modular electric charging apparatus according to claim 1, wherein said at least two insulating spacers have at least three slots.

12. The modular electric charging apparatus according to claim 1, wherein said plurality of support frames have voids to allow for concrete to pass therethrough.

13. The modular electric charging apparatus according to claim 1, wherein said cable trench form has voids to allow for concrete to pass therethrough.

14. The modular electric charging apparatus according to claim 13, wherein a top of said cable trench form is cast at grade or below finished grade.

15. The modular electric charging apparatus according to claim 1, wherein said cable trench form has a plurality of supporting ribs that are configured to support said canal.

16. The modular electric charging apparatus according to claim 1, wherein said cable trench form is permanently cast in place.

17. The modular electric charging apparatus according to claim 1, wherein said canal is configured to be shortened or extended.

18. The modular electric charging apparatus according to claim 1, wherein said at least two insulated spacers support said buss bars on a bottom and two sides of said buss bars.

19. The modular electric charging apparatus according to claim 18, wherein a height of said buss bars is adjustable to change a power transmission capacity.

20. The modular electric charging apparatus according to claim 1, wherein said cable trench form further includes a step for a recess for a cover.

* * * * *